UNITED STATES PATENT OFFICE.

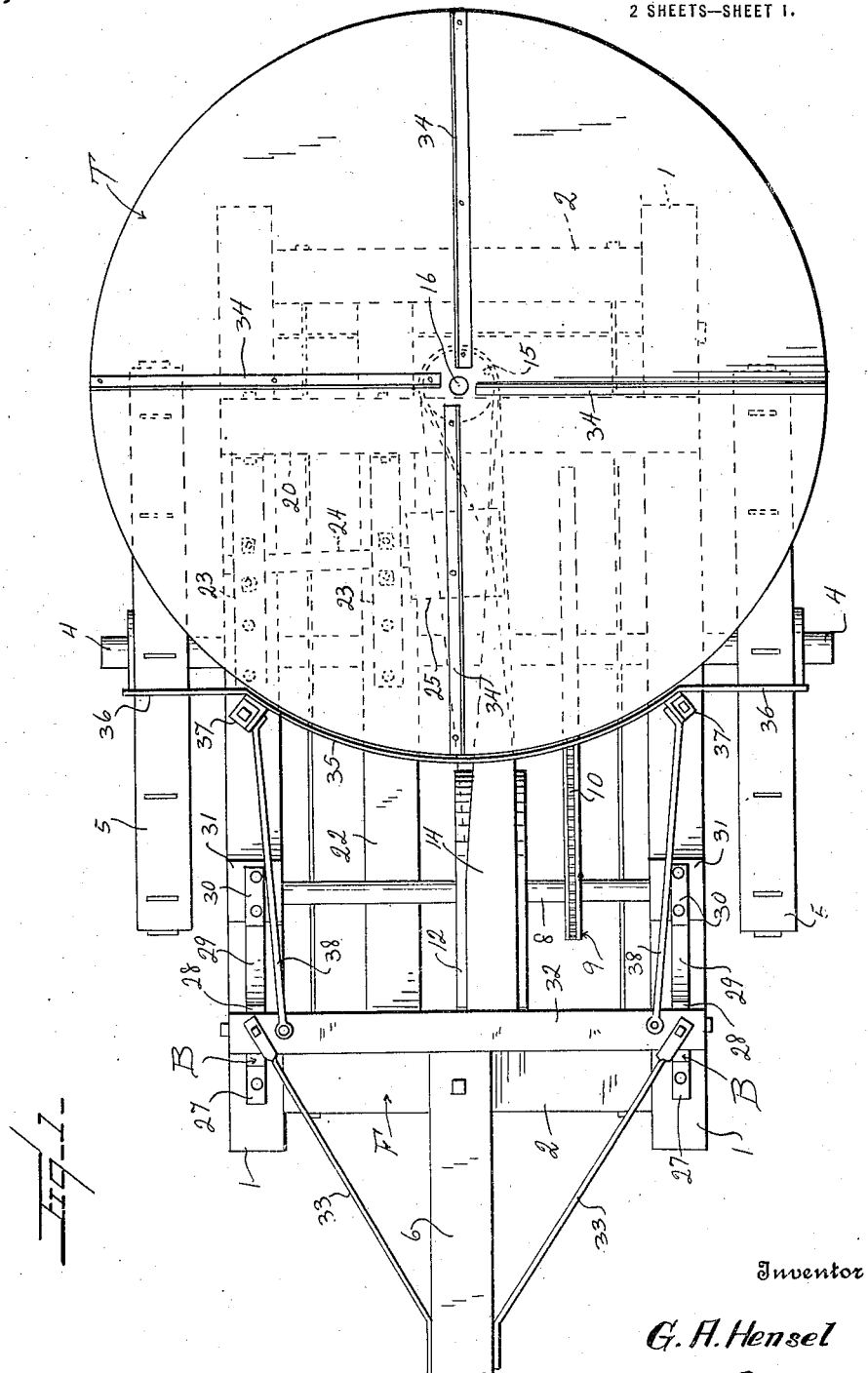

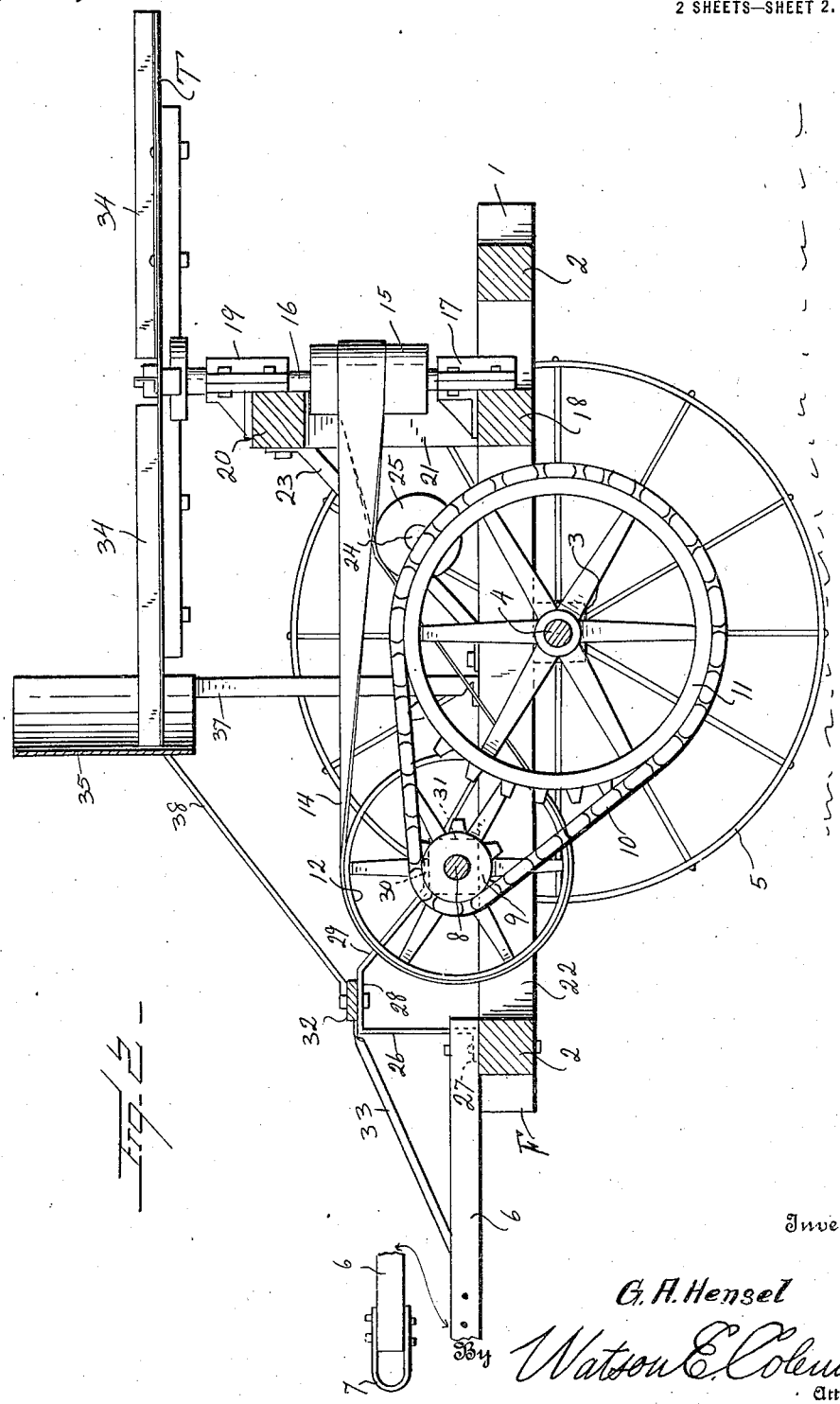

GEORGE A. HENSEL, OF WATERVILLE, WASHINGTON.

STRAW-SPREADER.

1,343,265.  Specification of Letters Patent.  Patented June 15, 1920.

Application filed December 29, 1919. Serial No. 347,929.

*To all whom it may concern:*

Be it known that I, GEORGE A. HENSEL, a citizen of the United States, residing at Waterville, in the county of Douglas and State of Washington, have invented certain new and useful Improvements in Straw-Spreaders, of which the following is a specification, reference being had to the accompanying drawings.

This invention relates to certain improvements in straw spreaders, and it is an object of this device to provide an improved device of this character which is adapted to be hitched or coupled to a vehicle carrying straw or fertilizer, and which spreader is in just proportion with respect to the vehicle so that the straw or fertilizer may be properly delivered to the spreader.

Another object of the invention is to provide a novel and improved device of this general character of a broadcast type and which includes a table or disk rotating about a vertical axis to throw broadcast the straw or fertilizer delivered thereon and wherein the shield or guard coacts with a portion of said table or disk to prevent discharge of the straw or fertilizer in the same general direction as the advance of the spreader in its travel.

Another object of the invention is to provide a novel and improved device of this character, which is gearless so that the same may be caused to operate with a minimum of wear, and wherein the rotating table or disk travels at a speed to evenly scatter the straw or fertilizer discharged thereupon to each side of the device.

The invention consists in the details of construction and in the combination and arrangement of the several parts of my improved straw spreader, whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a straw spreader, constructed in accordance with an embodiment of my invention, and Fig. 2 is a view partly in side elevation and partly in longitudinal vertical section of the device as disclosed in Fig. 1.

As disclosed in the accompanying drawings, F denotes a frame, preferably oblong in top plan and which includes the side members or beams 1 and the cross end beams 2. Depending from the central portions of the side members or beams 1 are the bearings 3 which rotatably support the axle 4. Suitably fixed to the opposite end portions of the axle 4 are the ground engaging wheels 5, so that during transit of the device the axle 4 is caused to rotate.

Suitably fixed to the forward cross member or beam 2 at the central portion thereof, is the rear extremity of a draft pole 6. The forward end portion of the draft pole has engaged therewith a clevis 7 or the like whereby a hitch may be effectively and conveniently had with a suitable vehicle, such as a combined harvester, barge, header, hay rack or other agricultural vehicle and from which vehicle the straw or fertilizer is adapted to be thrown or otherwise delivered to the spreader for proper scattering over the soil.

Supported by the side members or beams 1, at the forward portion of the frame F, is a transversely disposed shaft 8 having fixed thereto, adjacent one side frame F, a sprocket wheel 9. Disposed around the sprocket wheel 9 is the sprocket chain 10 and this chain is also disposed around a large sprocket wheel 11 fixed to the axle 4, whereby the shaft 8 is in driven connection to the axle 4.

Also fixed to the shaft 8 at substantially its center is a drum 12, around which is disposed a belt 14. The belt 14 extends rearwardly of the frame F and is directed around the pulley 15 rotating about a vertical axis. The pulley 15 is suitably fixed to the vertically disposed shaft 16.

The lower portion of the shaft 16 is rotatably engaged within the bearing 17 carried by a cross member 18 positioned at the rear portion of the frame F and the upper portion of the shaft is rotatably disposed through a bearing 19 carried by a cross member 20 supported at a predetermined distance above the frame proper through the instrumentality of the upstanding posts or standards 21 carried by the side members or beams 1 of the frame F.

The frame F at a point inwardly of but in close proximity to one of the side members or beams 1 is provided with a longitudinally disposed beam 22. Interposed between said beam 22 and the member 20 and also between the adjacent side member or beam 1 and the member 20 are the forwardly and downwardly inclined brace members 23. Clamped or otherwise secured to these brace members 23 is a transversely disposed rod 24 or the like upon which is loosely mounted a pulley 25 with which engages the lower stretch of the belt 14 and which belt of necessity must be twisted in order to properly engage the pulleys coacting therewith.

The forward end portions of each of the side members or beams 1 are provided with the upstanding brackets B and each of which brackets includes a vertically disposed portion 26 provided at its lower end with a foot 27 suitably anchored to the adjacent beam or member 1. The upper extremity of the portion 26 is continued by a rearwardly directed horizontal portion 28 which terminates in a downwardly and rearwardly inclined portion 29 terminating in a foot 30 anchored to a bearing 31 for the shaft 8.

The horizontal portions 28 of the brackets B have secured thereto the end portions of a transversely disposed member or beam 32. Interposed between the extremities of said beam 32 and the draft pole 6 are the brace rods 33. Fixed at its axial center to the upper portion of the shaft 16 is a circular table or disk T, having extending substantially radial thereacross, the upstanding vanes 34. As the straw or fertilizer is thrown or delivered upon the table or disk T, said straw or fertilizer is thrown broadcast and substantially evenly distributed at opposite sides of the device.

To prevent the straw or fertilizer being thrown by the table or disk T forwardly of the device or in the direction of its travel, I provide a fender 35. The central portion of the fender is arcuate in form and closely approaches the periphery of the table or disk T and the opposite end portions of said fender 35 terminate in the outstanding wings 36. The fender 35 extends a desired distance above the upper face or surface of the table or disk T as best meets the requirements of practice.

The opposite end portions of the fender 35 are suitably secured to the upstanding rods or posts 37 secured at their lower end portions to the central portions of the side members or beams 1. Interposed between the upper portions of said rods or standards 37 and the extremities of the member or beam 32 are the downwardly and forwardly inclined brace rods 38.

From the foregoing description it is thought to be obvious that a straw spreader constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A straw spreader comprising a portable frame, a vertically disposed shaft carried thereby, a scattering table fixed to the upper end portion of said shaft, a drive shaft carried by the frame and in driving connection with the vertically disposed shaft, upstanding posts carried by the frame adjacent the table, a fender supported by said posts and coacting with the peripheral portion of the table, the opposite end portions of said fender terminating in outstanding wings, the intermediate portion of the fender conforming to the peripheral configuration of the table, and bracing members coacting with the upper end portions of the post and with the frame.

In testimony whereof I hereunto affix my signature.

GEORGE A. HENSEL.